No. 792,718. PATENTED JUNE 20, 1905.
O. E. MITCHELL.
DIRIGIBLE HEADLIGHT FOR VEHICLES.
APPLICATION FILED AUG. 15, 1904.
2 SHEETS—SHEET 2.
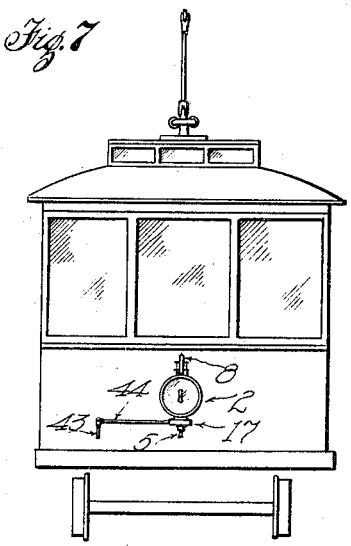
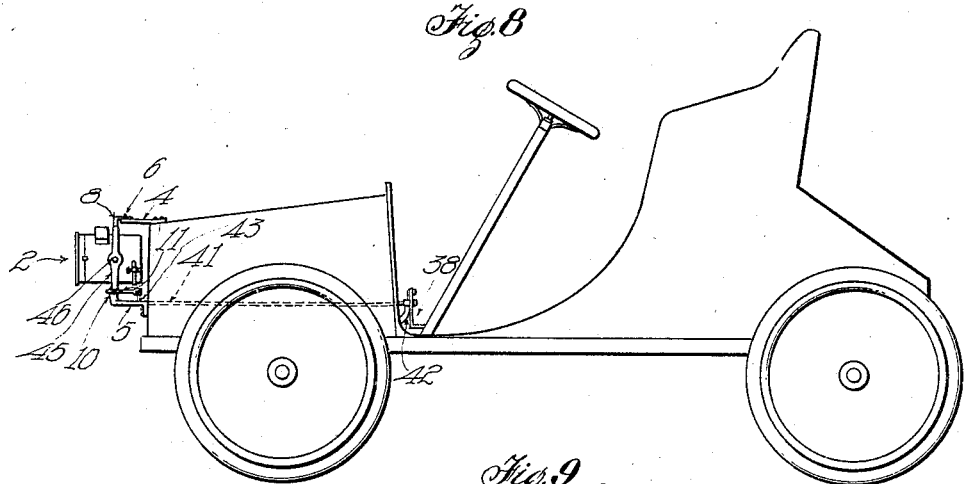
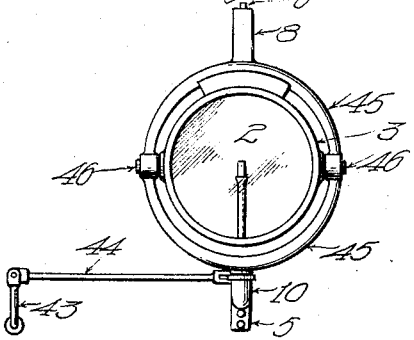
Witnesses
Inventor
Ora E. Mitchell
by Townsend Bros.
attys No. 792,718.

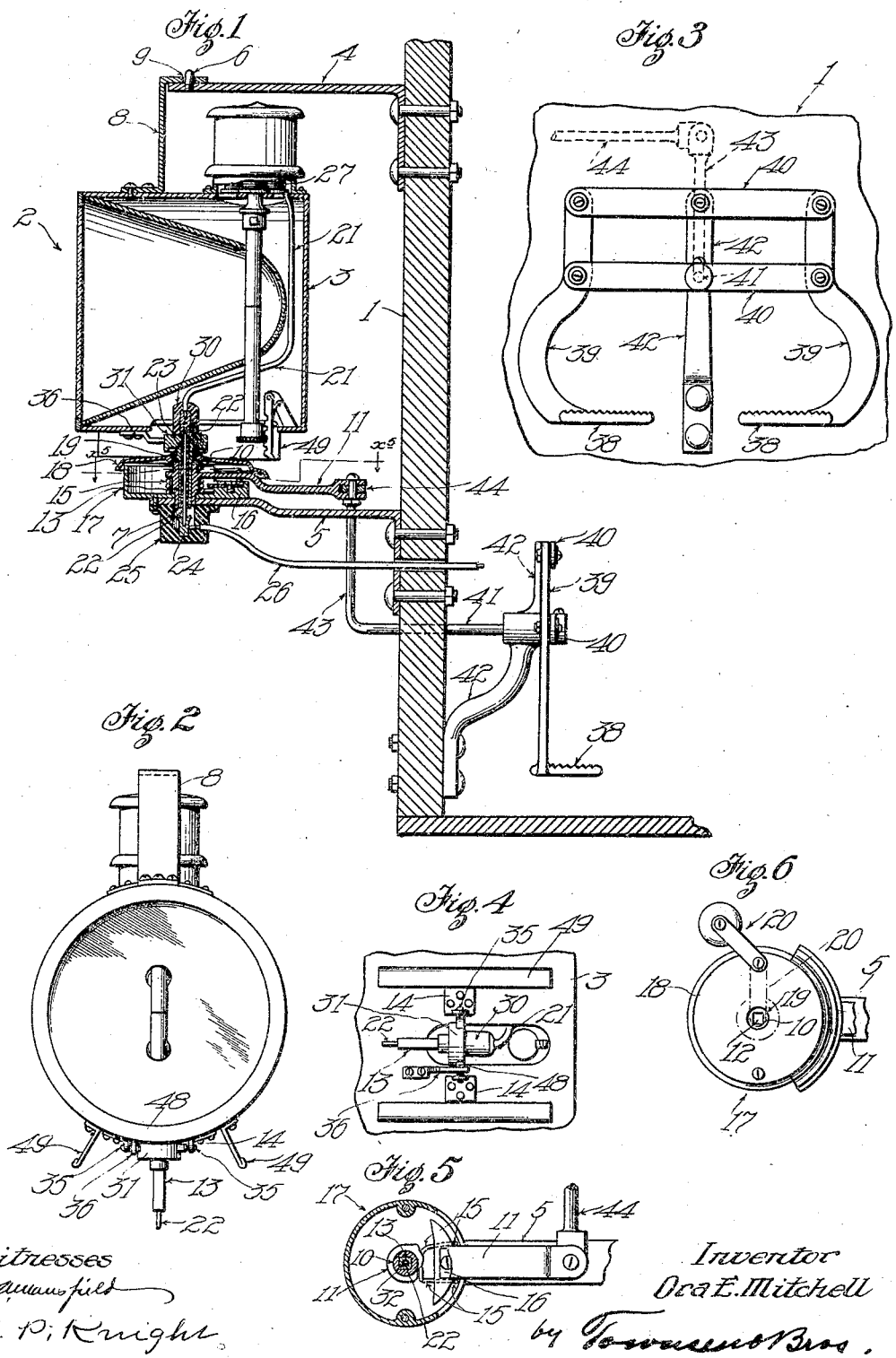

Patented June 20, 1905.

UNITED STATES PATENT OFFICE.

ORA E. MITCHELL, OF LOS ANGELES, CALIFORNIA, ASSIGNOR OF ONE-HALF TO WILLIAM D. NEWELL, OF LOS ANGELES, CALIFORNIA.

DIRIGIBLE HEADLIGHT FOR VEHICLES.

SPECIFICATION forming part of Letters Patent No. 792,718, dated June 20, 1905.

Application filed August 15, 1904. Serial No. 220,732.

*To all whom it may concern:*

Be it known that I, ORA E. MITCHELL, a citizen of the United States, residing at Los Angeles, in the county of Los Angeles and State of California, have invented a new and useful Dirigible Headlight for Vehicles, of which the following is a specification.

The main object of this invention is to provide a vehicle-headlight with improved directing means whereby it may be turned to direct its light to either side or straight ahead, as may be desired.

Another object of the invention is to provide convenient means whereby the motorman of a car may signal to cars or stations at a distance.

A further object of the invention is to provide means adapted for attachment to an ordinary headlight for dirigibly supporting the same and for enabling detachment of the headlight.

The accompanying drawings illustrate the invention. Figure 1 is a vertical section of the headlight on a car-dasher. Fig. 2 is a front elevation of the headlight detached from the vehicle. Fig. 3 is a rear elevation of the operating means for the pivotal headlight. Fig. 4 is an under side of a pivotal connection for the headlight in folded position. Fig. 5 is a detail section on the line $x^5$ $x^5$ in Fig. 1. Fig. 6 is a plan of the lower bracket. Fig. 7 is a front view of an electric car provided with the pivoted headlight. Fig. 8 is a side view of an automobile, showing the application of my invention thereto. Fig. 9 is a front view of the mounting of the headlight in Fig. 8.

1 designates a suitable support on the vehicle, which may be, for example, a dasher or dashboard of an electric car, which support carries the headlight mechanism hereinafter described. The headlight (indicated at 2) may be of any usual or suitable form, but it is here shown of the electric-arc-lamp type and is inclosed in a suitable case 3. Said case is supported on the dashboard or support 1 in such manner as to be capable of pivotal or rotative movement thereon, and for this purpose the dashboard may have brackets 4 5 fastened thereto, the upper bracket 4 being formed with a pin 6 and the lower bracket 5 being formed with a hole 7 to receive corresponding parts on the headlight-casing, said parts consisting of a bracket 8 at the top of said casing extending over and resting on the bracket 4 to support the headlight thereon, and provided with a hole 9 engaging the pin 6 aforesaid, so as to support and center the headlight, and socket means hereinafter described to center the headlight at the bottom.

The hole 7 in the lower bracket 5 receives a socket-pin or pivotal socket 10, which turns therein and is supported by the bracket 5, and carries an operating-arm 11 to enable its operation by the pedal device hereinafter described. The said pin 10 has a central bore or socket 12 of square or other non-circular cross-section to receive a correspondingly-shaped pin or stud 13, carried by brackets 14, secured to the bottom of the headlight-casing. By means of the pin-and-socket connections above described the headlight may be detached from its pivotal supports by simply lifting it. A spring 15, surrounding said socket-pin 10, engages at opposite ends with a fixed abutment 16 and with the arm 11, so as to tend to hold the headlight in straight-ahead position.

The above-described parts are desirably inclosed in a box 17, secured to the bracket 5 and having a removable cover 18 to shed the rain therefrom when the headlight is removed, said cover having a central hole 19 to permit passage of the centering-stud 13. A pivotal closure 20 may be provided, which normally is turned out of the way, as shown in full lines in Fig. 6, but which may be swung over the hole 19, as shown in dotted lines, when the headlight is removed, so as to form a complete protection for the socket parts.

In case an electric headlight is used the connection thereto is desirably formed through the socket means above described, one terminal wire 21 of the headlight ending in a terminal pin or connector 22, which is adapted to extend through a central perforation 23 in the stud 13 and to make contact with a socket-terminal 24, secured beneath the hole 7 in the bracket 5. Said socket-terminal may be secured in a cup 25, of insulating material, attached to the bottom of said bracket, a wire 26 leading from said socket to the electric connections of the car. The wire 21 aforesaid may lead from one side of the magnet 27 of the headlight, the other wire from said magnet being connected through the carbons of the lamp to the metallic casing 3, the bracket 8 thereon, and the bracket 4, on which the latter rests, to the dashboard, and so to ground. In order to maintain the insulation of the parts, the connector-pin 22 may have an insulating-head 30, resting on a collar 31 on stud 13, and the said stud may have an internal insulating-sleeve 32, which prevents the connector-pin from making contact with the socket-stud 10. The connector-pin 22 screws into a metal socket in head 30, the wire 21 being connected to said socket, so that the head 30 and wire 21 may be disconnected from the pivotal socket parts. The collar 31 may have a downturned rim 33 to shed rain or moisture away from the central opening 19 of the cover 18. When the headlight is detached from the pivotal supports, as shown in Fig. 2, the stud 13 and connector-pin 22 would hang down in such manner that they would be liable to be injured if the headlight were set on the floor. To avoid this, said members are desirably pivoted to the brackets 14, as by means of pivots or trunnions 35, (see Fig. 4,) a spring 36 engaging with a squared portion 48 of said swivel to hold the pivotal member 10 either in downwardly-extending position (shown in Figs. 1 and 2) or in folded position, (shown in Fig. 4,) in which position the member 13 folds up between the legs 49 of the headlight.

The means for operating the headlight to turn it to right or left is desirably a pedal device arranged in convenient position for operation by the motorman, said device consisting, for example, of two treadles 38, respectively, carried by bars 39, pivoted at opposite ends of parallel-motion levers 40, one of said levers being attached to a rock-shaft 41, journaled in a fixed bracket 42, said rock-shaft having an arm 43, connected by a rod or link 44 to the arm 11 aforesaid in such manner that depression of one or the other of the pedals 38 will cause the rock-shaft to turn correspondingly and will swing the headlight to right or left, the headlight being returned to normal or straight-ahead position by means of the spring 15.

To illustrate the use of the device, we will assume that it is located on an electric car and that the car is about to round a curve, turning to the right. The motorman will depress the left-hand treadle 38, thereby causing the light to turn to the right and direct its light along the curve. In approaching a crossing the motorman can swing the light first to one side and then to the other to make sure that there is nothing approaching on either side, and generally by use of the pivotal connections he can so direct the light as to be fully informed at all times as to the condition of the track ahead or as to possible danger on either side. A further application of the invention is in signaling from one car to another or from the car to a station or to persons along the track. By swinging the light to one or both sides any desired number of times he can by a prearranged code of signals communicate desired information to other parties. For example, he may signal to another motorman at a distant turnout or switch that he is about to proceed or that the other car may proceed.

The headlight can be removed by simply lifting it off of its pivotal supports, and by shutting the closure 20 the socket means are effectually protected from rain.

Fig. 8 represents the application of the invention to an automobile, the headlight in that case being of any desired type and being operated by means substantially the same as above described, except that the rock-shaft 41 will be of suitable length to extend rearwardly from the front of the automobile to bring the operating-pedals 38 in convenient position to be operated by a person sitting in the automobile. In this application of the invention it may be desirable to provide means for swiveling the headlight on a horizontal axis in addition to its swivel movement above described on a vertical axis. For this purpose a swivel-frame 45 is provided, which carries the swivel members 8 and 10 aforesaid, the headlight-casing 3 being pivotally mounted in said frame by horizontal pivots 46. In the figures the headlight is assumed to be of the acetylene or other type not requiring electrical connection.

It will be understood that the connection of the pivotal support and operating connections for the headlight may be varied without departing from my invention. Thus the operating-arm 43 may extend either upwardly or downwardly, according to the disposition of the other parts on the car or the direction it is desired to turn the light by a given movement of the treadle device.

What I claim is—

1. The combination with a vehicle and a support thereon with the upper and lower brackets, of a socket pivotally mounted on the lower bracket, means for pivotally operating said socket, a headlight, a member hinged on the bottom of the headlight to permit it to fold thereon and detachably engaging the pivotal socket to turn therewith, and means on the headlight for detachably and pivotally engaging the upper bracket.

2. The combination with a vehicle and a support thereon with upper and lower brackets, of a socket pivotally mounted on the lower bracket, means for pivotally operating said socket, a headlight, a member hinged on the bottom of the headlight to permit it to fold thereon and detachably engaging the pivotal socket to turn therewith, spring means engaging the hinged member to hold it in extended or folded position, and means on the headlight for detachably and pivotally engaging the upper bracket.

3. The combination with a vehicle, of a socket pivotally mounted thereon, a headlight having a member detachably engaging said socket to turn therewith, means for pivotally operating said socket, a cover over said socket and having an aperture in line with the socket and a movable cover for said aperture.

4. The combination with a vehicle, of a socket pivotally mounted thereon, a headlight detachably connected with said socket, a spring surrounding said socket and having its ends extending therefrom, stop means engaging the respective ends of the spring, and a lever connected to the pivotal socket and extending between the ends of said spring to engage the respective ends in reverse movements of the lever.

5. The combination with a vehicle, of a socket pivotally mounted thereon, an insulated terminal mounted in fixed position in line with the socket, an electric headlight having a member engaging in the socket to turn therewith, said member provided with a terminal insulated therefrom and extending therethrough to engage the aforesaid terminal, and means connected to the socket to pivotally operate the same.

In testimony whereof I have hereunto set my hand, at Los Angeles, California, this 6th day of August, 1904.

ORA E. MITCHELL.

In presence of—
FREDERICK S. LYON,
TILLIE E. ADAM.